(12) United States Patent
Tokell et al.

(10) Patent No.: US 7,789,318 B2
(45) Date of Patent: Sep. 7, 2010

(54) WALL MOUNTED DOMESTIC COMBINED HEAT AND POWER APPLIANCE

(75) Inventors: David Anthony Tokell, Mooroolbark (AU); John Antony Stephenson, Cambridge (GB); Adam Richard Gregory, Coalville (GB); David Anthony Clark, Huntingdon (GB)

(73) Assignee: Microgen Engine Corporation Holding B.V., Ulft (NL)

( * ) Notice: Subject to any disclaimer, the term of this patent is extended or adjusted under 35 U.S.C. 154(b) by 1512 days.

(21) Appl. No.: 10/524,363

(22) PCT Filed: Aug. 11, 2003

(86) PCT No.: PCT/GB03/03516

§ 371 (c)(1),
(2), (4) Date: Feb. 11, 2005

(87) PCT Pub. No.: WO2004/015261

PCT Pub. Date: Feb. 19, 2004

(65) Prior Publication Data

US 2005/0284947 A1    Dec. 29, 2005

(30) Foreign Application Priority Data

Aug. 12, 2002   (GB) ................... 0218740.9

(51) Int. Cl.
*F02G 1/043*   (2006.01)
*F02G 3/00*    (2006.01)
*F02B 63/04*   (2006.01)
*A47F 5/08*    (2006.01)

(52) U.S. Cl. ................... 237/12.1; 60/39.01; 123/2; 290/1 A; 248/231.91; 248/674; 248/675

(58) Field of Classification Search ............... 237/12.1; 60/39.01, 793, 624; 248/231.91, 300, 674, 248/675; 123/2; 290/1 A
See application file for complete search history.

(56) References Cited

U.S. PATENT DOCUMENTS

| | | | | |
|---|---|---|---|---|
| 1,778,992 A * | 10/1930 | Wulfert | ................... | 248/635 |
| 3,140,071 A * | 7/1964 | Lorentzen | ................... | 248/273 |
| 3,553,506 A * | 1/1971 | Fresard | ................... | 310/91 |
| 3,841,426 A | 10/1974 | Nemschoff | | |
| 4,065,055 A * | 12/1977 | De Cosimo | ................... | 237/12.1 |
| 4,232,421 A * | 11/1980 | Tucker | ................... | 16/2.2 |
| 4,263,498 A * | 4/1981 | Meyers | ................... | 392/451 |
| 4,387,605 A | 6/1983 | Grey et al. | | |
| 4,389,844 A * | 6/1983 | Ackermann et al. | ........... | 60/517 |
| 4,441,684 A * | 4/1984 | Credle, Jr. | ................... | 248/674 |

(Continued)

FOREIGN PATENT DOCUMENTS

GB   2367335   10/1974

*Primary Examiner*—Steven B McAllister
*Assistant Examiner*—Patrick F. O'Reilly, III
(74) *Attorney, Agent, or Firm*—Ballard Spahr LLP

(57) ABSTRACT

A wall mounted domestic combined heat and power appliance comprising housing (1) containing a prime mover to generate electrical power and heat output. At least one bracket (2) at each side of the housing mounts the housing to a wall (W). Each bracket comprises a main body which is elongate in a vertical direction and has a L-shape cross section. Each extremity of the L-shape cross section has an enlarged portion (22, 23), a first (23) of which provides a spacer between the main body and the housing, and a second (22) of which provides a spacer between the main body and the wall.

8 Claims, 2 Drawing Sheets

U.S. PATENT DOCUMENTS

| | | | | |
|---|---|---|---|---|
| 4,495,901 A | * | 1/1985 | Nannini et al. | 123/2 |
| 4,510,756 A | * | 4/1985 | Hise et al. | 60/659 |
| 4,746,092 A | * | 5/1988 | Hayashi et al. | 248/638 |
| 4,873,840 A | * | 10/1989 | Gilliusson | 62/238.6 |
| 4,920,276 A | * | 4/1990 | Tateishi et al. | 290/2 |
| 5,076,525 A | * | 12/1991 | Whipple | 248/300 |
| 5,240,222 A | * | 8/1993 | Seeley et al. | 248/638 |
| 5,266,856 A | * | 11/1993 | Holter | 310/51 |
| 5,433,414 A | * | 7/1995 | Vieira | 248/316.4 |
| 5,464,187 A | * | 11/1995 | Linkner, Jr. | 248/635 |
| 5,799,481 A | * | 9/1998 | Fetescu | 60/783 |
| 6,044,640 A | * | 4/2000 | Guimaraes | 60/783 |
| 6,328,274 B1 | * | 12/2001 | Hayashi | 248/638 |
| 6,536,729 B1 | * | 3/2003 | Haddock | 248/300 |
| 6,775,981 B2 | * | 8/2004 | Fukuda et al. | 60/597 |
| 2002/0056993 A1 | * | 5/2002 | Kennedy | 290/1 A |
| 2002/0088237 A1 | | 7/2002 | Graber et al. | |
| 2002/0162808 A1 | * | 11/2002 | Jordan | 211/26 |

* cited by examiner

WALL MOUNTED DOMESTIC COMBINED HEAT AND POWER APPLIANCE

CROSS REFERENCE TO RELATED APPLICATIONS

The present application claims priority to Great Britain Application No. 0218740.9, filed Aug. 12, 2002, which application is incorporated herein fully by this reference.

The present invention relates to a wall mounted combined heat and power appliance. The invention has been motivated by the need to improve the mounting of a combined heat and power appliance having a linear free piston Stirling engine. However, it can be applied to any wall mounted combined heat and power appliance where the prime mover generates undesirable vibration.

The linear free piston Stirling engine operates at a generally constant frequency and tends to vibrate primarily in a single direction, being the direction of reciprocation of the engine. Such vibrations can be substantially cancelled out by suspending an absorber mass from the engine on a spring (as disclosed in our earlier UK application No. 0203016.1.

Further, by suspending the engine on a number of low-stiffness springs, transmission of any resultant vibrations to the engine mounting can be reduced (see our earlier application 0203016.1).

The Stirling engine requires a seal between the vibrating Stirling engine and an externally mounted burner in order to prevent the burner gases from escaping into the housing and into the dwelling. Such a seal represents an interface between a vibrating component and a static component. The seal can be designed to be flexible in the direction of the reciprocation of the engine, but tends to be relatively stiff in the horizontal plane. Thus, vibrations in the horizontal plane of the engine and the absorber mass are not isolated from the appliance casing. The vibrations are consequently transmitted to the wall, causing the wall to vibrate, and exciting resonances in the wall and other structures. These resonances are the major cause of unacceptable vibration problems on prototype units which we have tested to date.

The present invention aims to solve this problem.

According to the present invention, a wall mounted domestic combined heat and power appliance comprises a prime mover to generate electrical power and heat output, a housing containing the prime mover and at least one bracket at each side of the housing to mount the housing to a wall, each bracket comprising a main body which is elongate in a vertical direction and has an L-shape section, each extremity of the L-shape cross section having an enlarged portion, a first of which provides a spacer between the main body and the housing, and a second of which provides a spacer between the main body and the wall.

This bracket arrangement has the necessary vertical rigidity to support the weight of the prime mover (and any associated absorber mass). However, the bracket also provides the necessary flexibility in the horizontal plane, both in direction towards and away from the wall (subsequently referred to as the in/out direction), and the direction parallel to the wall subsequently referred to as the left/right direction). The presence of the two enlarged portions provides sufficient clearance to allow this vibration in the horizontal plane. The brackets greatly reduce or eliminate the transference of horizontal vibrations to the wall.

A single bracket may be provided on each side of the housing. However, the current preference is to provide two such brackets on each side of the housing spaced in the vertical direction. More than two brackets could also be provided.

As previously mentioned, the present invention is particularly applicable to a linear free piston Stirling engine, and particularly, to one from which an absorber mass is suspended to reduce vibrations in the vertical direction.

With any domestic combined heat and power appliance of this type, several other connections to the outside world are required. For example, it may require a supply of combustible gas, a supply of air to a burner and an outlet for exhaust gases from the burner. In addition, to extract the heat, the unit may require an inlet for cold water and an outlet for heated water.

The housing is, therefore, provided with flexible inlet/outlet fluid connections.

Such a connection may for example, take the form of an inlet/outlet pipe extending through an oversize hole in the housing, with a flexible seal between the hole and the pipe. Preferably, two such flexible seals are provided internal to the housing and one external to the housing respectively. The presence of at least one flexible seal ensures that the pipe is centred within the hole, prevents the pipe from making direct contact with the housing, prevents transmission of noise through the clearances and allows thermal expansion of the casing.

The liquid pipe, in particular, can serve to transmit pressure pulses. To reduce these, each pipe is preferably provided with a flexible section to absorb the pressure pulses. Preferably, such flexible sections are bellows sections.

Examples of an appliance in accordance with the present invention will now be described with reference to the accompanying drawings, in which.

The DCHP unit comprises a linear free piston Stirling engine, from which an absorber mass is suspended in order to absorb vibrations in the direction of linear motion. Such a unit is described in greater detail in our earlier application 0203016.1. The detailed construction of the engine is not of concern in the present invention.

The engine is mounted within a housing 1 on a frame (not shown) on a plurality of low stiffness springs (not shown) as disclosed in GB 0203016.1. This reduces the level of vertical vibration to a manageable level. However, the seal between the burner and the engine head is relatively stiff, and tends to transmit vibrations in the horizontal plane from the engine head to the burner assembly and hence to the unit housing.

Figure 1:
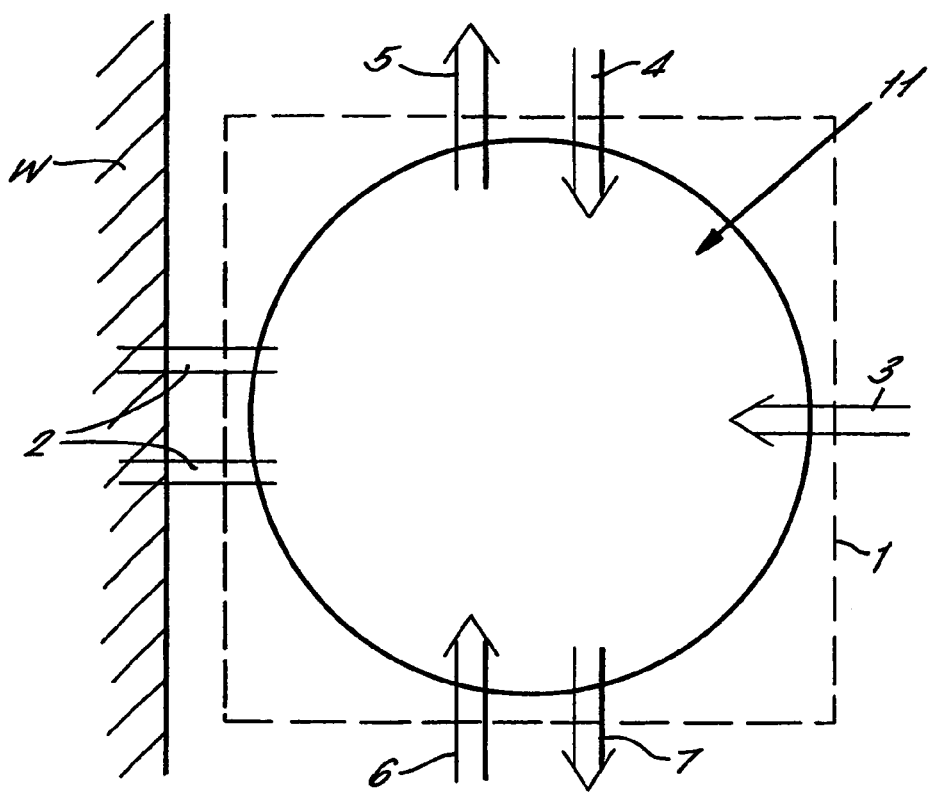
FIG. 1 is a schematic diagram of the connections between the appliance and the outside wall.

As shown in FIG. 1, the engine is required to have a number of connections with the outside world. Wall mounts 2 are provided to mount the engine and this will be described in greater detail with reference to FIGS. 2 and 3. The Stirling engine burner requires a combustible fuel inlet 3 and air intake 4. An exhaust gas outlet 5 is also required to transmit the exhaust gas from the burner. In practice, the air intake 4 and the exhaust gas outlet 5 will be concentric to pre-heat incoming air.

An inlet 6 and an outlet 7 for the circulation of the water to/from the domestic water heater or central heating are required.

The air intake 4 and exhaust gas outlet 5 for the burner are both connected to a recuperator which sits above the Stirling engine and hence does not vibrate. Therefore this concentric arrangement simply requires a rubber concertina seal to seal to a respective housing, to ensure that the concentric flue is spaced from and generally centred within a hole within the housing, so that it does not receive any vibration from the housing itself.

Figure 4:
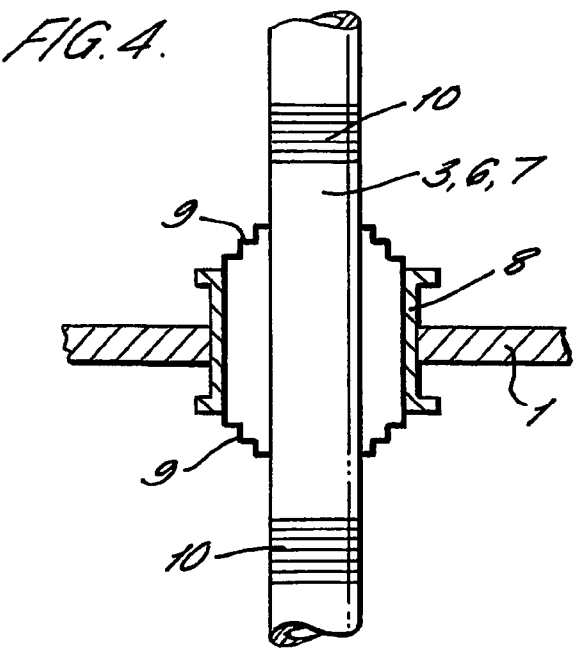
FIG. 4 is a cross-section through a fluid connection to the appliance.

The fuel inlet 3 is connected to the burner housing and therefore is caused to vibrate with the burner housing. For this reason, an arrangement such as that shown in FIG. 4 is provided. In this arrangement, the fuel inlet 3 extends through in an oversize hole in the form of a housing formed by a short length of tube 8. The tube 8 is sealed at its top and bottom end with a rubber boot 9 which holds the fuel inlet 3 away from the tube 8 and ensures that vibration of the inlet pipe is not transmitted to the housing. The space between the pipe 3 and tube 8 may be filled with compliant noise attenuation material.

The water inlet/outlets 6, 7 are also in contact with a vibrating part of the engine, and a similar arrangement is used to isolate pipes 6, 7 from the housing 1 as described above with reference to the fuel inlet 3. In addition to the features described with reference to the gas inlet, the water inlet and outlet are also provided with two bellows sections 10 and which are designed to reduce pressure pulses in the liquid thereby minimising their transmission downstream.

Access to the housing 1 is required for maintenance purposes as indicated by arrow 11. Such access is provided by a replaceable panel with a rubber edge seal. This is designed to allow the easy, secure replacement of the panel while minimising the risk of introducing leaks each time it is removed.

Figure 2:
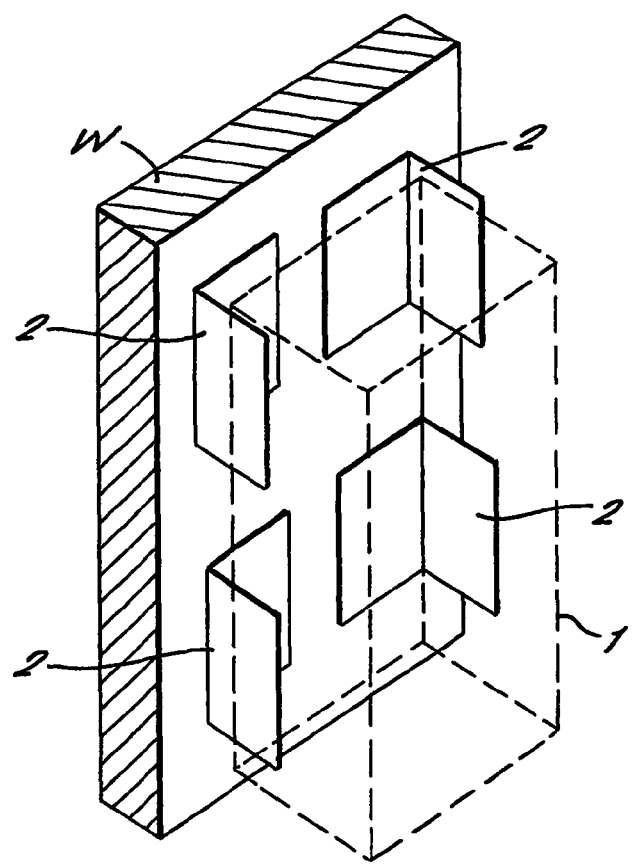
FIG. 2 is a schematic perspective showing the lid of the wall mounting in brackets.
Figure 3:
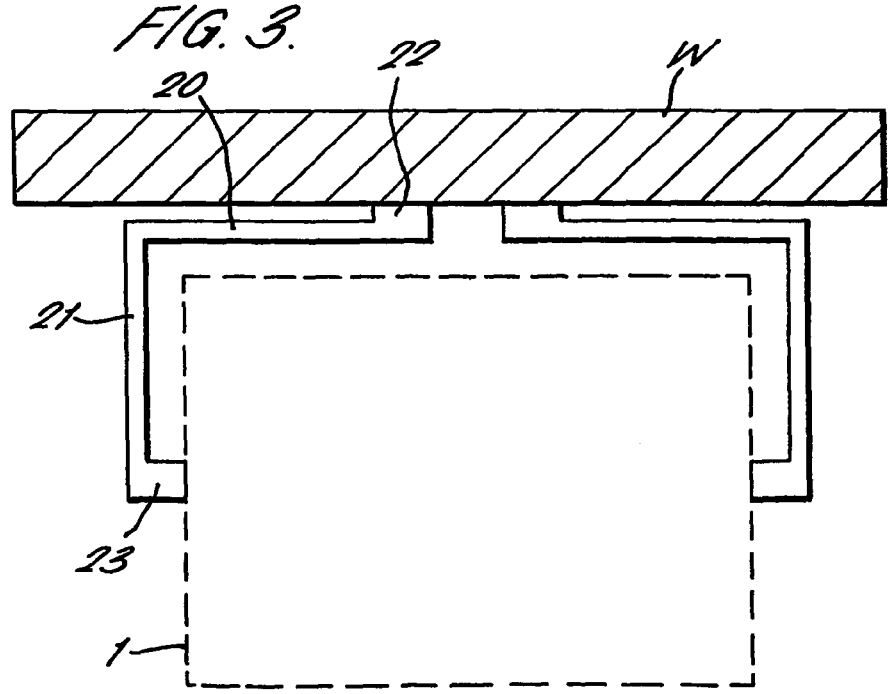
FIG. 3 is a more detailed diagram of the appliance as shown in FIG. 2.

The wall brackets 2 are shown in greater detail in FIGS. 2 and 3. As shown in FIG. 2, the housing 1 is supported by four brackets 2 with two brackets being positioned on each side of the housing 1 and being vertically displaced from one another.

The brackets have a generally L-shape cross section shown in greater detail in FIG. 3. The L-shaped cross section comprises a first side 20 parallel to the wall W, and a second side 21 extending away from the first side 20 perpendicular to the wall W. The first side 20 is spaced from the wall W by an enlarged portion 22 which extends from the first side 20 towards the wall W. Similarly, the second side 21 is spaced from the housing 1 by an enlarged portion 23 which extends from the second side 21 towards the housing 1.

The wall brackets are designed to give a natural frequency of 20 Hz. To ensure this, the lateral stiffness is 12,000 N/m (±1000 N/m). Aluminium brackets are used, which, for the arrangement incorporating 4 brackets, are of length 225 mm and edges of 100 mm each. The material thickness is 1.5 mm. Dimensions for alternative arrangements, using different numbers of brackets, would reflect the required stiffness.

As will be appreciated from FIGS. 2 and 3, the brackets 2 provide adequate stiffness in the vertical direction allowing the vertical load of the Stirling engine and absorber mass to be adequately supported. However, as will be apparent from FIG. 3, any vibrations in the horizontal plane are accommodated by the flexibility of the brackets 2, as well as the clearances which are provided between the sides 20 and 21 of the brackets and the housing 1 and wall W respectively by the enlarged portions 22 and 23.

The invention claimed is:

1. An appliance comprising:
  a domestic combined heat and power appliance including a prime mover to generate electrical power and heat output, a housing containing the prime mover;
  and at least one bracket at each side of the housing structurally supporting the housing from a vertical wall, each bracket being independent from the other and comprising a main body which extends in a vertical direction when installed on the vertical wall and has a L-shape cross section as defined in a horizontal plane, each extremity of the L-shape cross section having an enlarged portion, a first of which extends continuously from a first leg of the main body and provides a spacer between the first leg of the main body and the housing, and a second of which extends continuously from a second leg of the main body and provides a spacer between the second leg of the main body and the wall.

2. An appliance according to claim 1, wherein a plurality of brackets are provided at each side of the housing.

3. An appliance according to claim 2 wherein the prime mover is a linear free piston Stirling engine.

4. An appliance according to claim 1 wherein the prime mover is a linear free piston Stirling engine.

5. An appliance according to claim 1 wherein the housing is provided with at least one flexible inlet/outlet connection for fluid.

6. An appliance according to claim 5, wherein the flexible connection is provided by an oversize opening in the housing through which an inlet/outlet pipe extends, and a flexible seal between the hole and the pipe.

7. An appliance according to claim 6, wherein the inlet/outlet pipe is provided with a flexible pipe section to absorb pressure pulses.

8. An appliance according to claim 5, wherein the inlet/outlet connection is provided with a flexible pipe section to absorb pressure pulses.

* * * * *